(12) United States Patent
Kaliaperumal

(10) Patent No.: US 10,880,933 B2
(45) Date of Patent: Dec. 29, 2020

(54) ENABLING DATA SERVICES FOR VISITING USERS

(71) Applicant: ARRIS Enterprises LLC, Suwanee, GA (US)

(72) Inventor: Rajesh Kaliaperumal, Cupertino, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/101,048

(22) Filed: Aug. 10, 2018

(65) Prior Publication Data
US 2019/0053300 A1 Feb. 14, 2019

Related U.S. Application Data

(60) Provisional application No. 62/544,814, filed on Aug. 12, 2017.

(51) Int. Cl.
| | |
|---|---|
| *H04W 8/00* | (2009.01) |
| *H04W 76/11* | (2018.01) |
| *H04W 88/12* | (2009.01) |
| *H04W 12/06* | (2009.01) |
| *H04W 12/08* | (2009.01) |

(52) U.S. Cl.
CPC ............ *H04W 76/11* (2018.02); *H04W 8/005* (2013.01); *H04W 12/06* (2013.01); *H04W 12/08* (2013.01); *H04W 88/12* (2013.01)

(58) Field of Classification Search
CPC ..... H04W 76/11; H04W 8/005; H04W 12/06; H04W 12/08; H04W 88/12; H04W 8/14
See application file for complete search history.

(56) References Cited

U.S. PATENT DOCUMENTS

| | | | |
|---|---|---|---|
| 2011/0082940 A1* | 4/2011 | Montemurro | H04L 61/1541 709/227 |
| 2012/0102556 A1* | 4/2012 | Tapia | H04W 12/06 726/7 |
| 2014/0028818 A1 | 1/2014 | Brockway, III et al. | |

(Continued)

OTHER PUBLICATIONS

PCT International Search Report & Written Opinion, RE: Application No. PCT/US2018/046420, dated Oct. 5, 2018.

*Primary Examiner* — Joseph E Dean, Jr.
(74) *Attorney, Agent, or Firm* — Steven Stupp; Stewart Wiener

(57) ABSTRACT

During operation, an electronic device may receive one or more first packets from another electronic device, where the one or more first packets include policy information and credential information. Based on the policy information and the credential information, the electronic device may establish an access point name (APN) transport pairing between the electronic device and the other electronic device, where the APN transport pairing is associated with a visited network that uses a shared-license-access band of frequencies or a licensed spectrum. Note that the policy information and the credential information may specify the APN transport pairing with the visited network, and that the policy information and the credential information may be pre-installed in or on the other electronic device. Moreover, the communication between a radio node in the visited network and the other electronic device may use an LTE communication protocol.

20 Claims, 5 Drawing Sheets

(56) References Cited

U.S. PATENT DOCUMENTS

2014/0335791 A1* 11/2014 Kim ................... H04W 4/023
                                                        455/41.2
2016/0192186 A1    6/2016 Lin

* cited by examiner

ENABLING DATA SERVICES FOR VISITING USERS

CROSS-REFERENCE TO RELATED APPLICATION

This application claims the benefit of U.S. Provisional Patent Application No. 62/544,814, filed Aug. 12, 2017.

BACKGROUND

Field

The described embodiments relate to techniques for communicating information among electronic devices. In particular, the described embodiments relate to techniques for establishing a transport pairing with a visited network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

In addition to cellular-telephone networks operated by mobile-network operators, private networks (which are henceforth referred to as 'visited networks') that use shared-license-access band of frequencies have been proposed. For example, visited networks may be deployed in a variety of locations, such as shopping malls, malls, enterprises, stadiums, etc. In principle, a visited network can provide a local service to users.

In practice, it can be difficult to establish a connection or a transport pairing between a visited network and a user's electronic device. In particular, in order to establish a connection or a transport pairing between the visited network and the electronic device, a user of the electronic device may need to have a subscription with a visited-network operator, and thus credentials for the visited network. However, given the expected large number of visited networks, it may be cumbersome for a user to have multiple subscriptions with different visited-network operators.

Alternatively, a mobile-network operator may facilitate a connection or a transport pairing between a visited network and an electronic device. In particular, the mobile-network operator may provide credentials for the visited network to the electronic device. However, this may require the mobile-network operator to maintain a mapping between visited networks and the associated credentials. This may be cumbersome and complicated, both because of the expected large number of visited networks and the dynamic nature of visited networks. Consequently, there is a risk that the stored credentials for a visited network may not be valid.

SUMMARY

The described embodiments relate to an electronic device that establishes an access point name (APN) transport pairing. This electronic device includes an interface circuit that communicates with a radio node in a visited network. During operation, the electronic device receives, from an input node of the electronic device, one or more first packets associated with another electronic device, where the one or more first packets include policy information and credential information. Then, based on the policy information and the credential information, the electronic device establishes, via an output node of the electronic device, the APN transport pairing between the electronic device and the other electronic device, where the APN transport pairing is associated with the visited network.

Note that the policy information and the credential information may specify the APN transport pairing with the visited network.

Moreover, the policy information and the credential information may be pre-installed in the other electronic device.

Furthermore, the visited network may use a shared-license-access band of frequencies or a licensed spectrum (such as a licensed band of frequencies).

Additionally, the visited network may use a Long Term Evolution (LTE) communication protocol.

In some embodiments, the interface circuit communicates with a mobile-network-operator infrastructure in a cellular-telephone network and the one or more first packets include additional information. Moreover, prior to establishing the APN transport pairing, the interface circuit may: provide, to the output node, a second packet for the mobile-network-operator infrastructure, where the second packet includes the additional information; receive, from the input node, a third packet associated with the mobile-network-operator infrastructure that indicates a second transport pairing has been established between the other electronic device and the cellular-telephone network; and provide, to the output node, a fourth packet for the other electronic device that indicates that the second transport pairing has been established between the other electronic device and the cellular-telephone network.

Note that the additional information may include at least one of: authentication information that authenticates the other electronic device to the cellular-telephone network, credentials for an account with the cellular-telephone network, and subscriber information. Moreover, the second transport pairing may be associated with voice traffic.

Furthermore, the interface circuit may: provide, to the output node, a second packet for the mobile-network-operator infrastructure, where the second packet includes a request to establish a second transport pairing; receive, from the input node, a third packet associated with the mobile-network-operator infrastructure that indicates that the second transport pairing has been established between the other electronic device and the cellular-telephone network; and provide, to the output node, a fourth packet for the other electronic device that indicates that the second transport pairing has been established between the other electronic device and the cellular-telephone network. For example, the second transport pairing may include an International Mobile Services (IMS) transport pairing and/or may be associated with data traffic. More generally, these or other transport pairings may be established to provide services to the other electronic device, such as a multimedia messaging service (MMS) transport, etc.

Additionally, the radio node may include an eNode-B.

Another embodiment provides a computer-readable storage medium with a program module for use with the electronic device. When executed by the electronic device, this program module causes the electronic device to perform at least some of the aforementioned operations.

Another embodiment provides a method, which may be performed by the electronic device. This method includes at least some of the aforementioned operations.

Another embodiment provides the other electronic device in which the policy information and the credential information have been pre-installed.

Another embodiment provides a computer-readable storage medium with a program module for use with the other electronic device. When executed by the other electronic device, this program module causes the other electronic device to perform at least some counterpart operations to the aforementioned operations.

Another embodiment provides a method, which may be performed by the other electronic device. This method includes at least some counterpart operations to the aforementioned operations.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
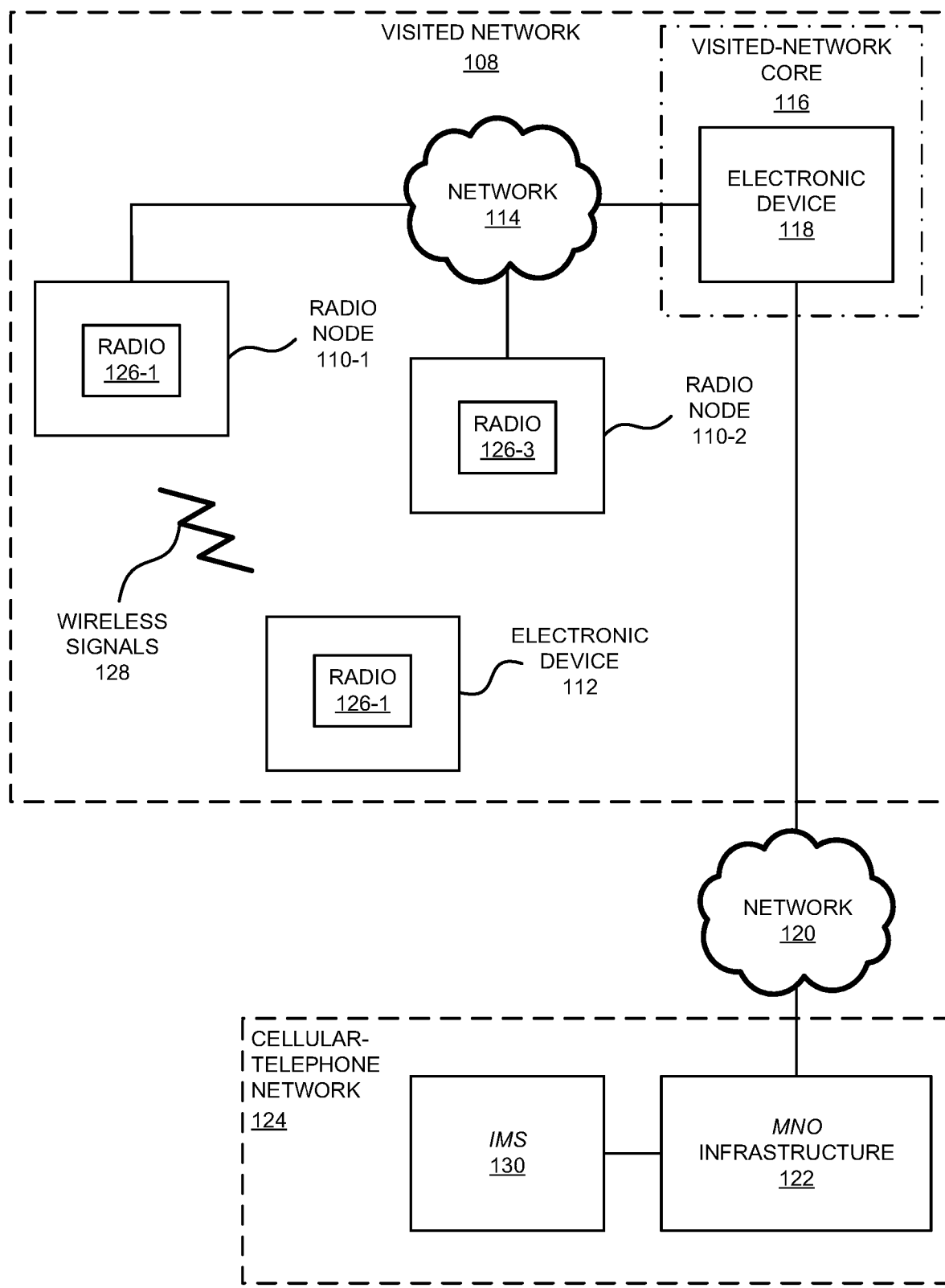
FIG. 1 is a block diagram illustrating electronic devices wirelessly communicating in accordance with an embodiment of the present disclosure.

An electronic device that establishes an APN transport pairing is described. During operation, the electronic device may receive one or more first packets associated with another electronic device, where the one or more first packets include policy information and credential information. Based on the policy information and the credential information, the electronic device may establish an APN transport pairing between the electronic device and the other electronic device, where the APN transport pairing is associated with a visited network that uses a shared-license-access band of frequencies or a licensed spectrum. Note that the policy information and the credential information may specify the APN transport pairing with the visited network, and that the policy information and the credential information may be pre-installed in or on the other electronic device. Moreover, communication between a radio node in the visited network and the other electronic device may use an LTE communication protocol.

By establishing the APN transport pairing, the communication technique may facilitate faster and less complicated communication between the electronic device and the visited network. This approach may eliminate the need for a mobile-network operator of a cellular-telephone network to provide credentials to the electronic device or approve the APN transport pairing. Moreover, a user of the electronic device may not need a subscription with a visited-network operator of the visited network. Consequently, the communication technique may facilitate services provided by visited networks to electronic devices using shared-license-access band of frequencies. Alternatively or additionally, the communication technique may facilitate services provided by visited networks to electronic devices using a licensed spectrum or a licensed band of frequencies. In turn, the improved communication and services may improve the user experience, and thus may improve customer satisfaction and retention.

In the discussion that follows, the electronic device communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, a cellular-telephone communication protocol, Wi-Fi and/or Long Term Evolution (LTE) are used as illustrative examples. However, a wide variety of communication protocols may be used.

Moreover, the communication technique may be applied to one or more channels in one or more bands of frequencies. In the discussion that follows, one or more channels in a shared-license-access band of frequencies are used as an illustrative example. For example, a shared-license-access band of frequencies near 3.5 GHz (such as between 3.55 and 3.7 GHz) may be used. This shared-license-access band of frequencies is sometimes referred to as 'Citizen Broadband Radio Service' (CBRS). However, a wide variety of bands of frequencies may be used, including: a band of frequencies near or including 2.4 GHz, a band of frequencies near or including 3.6 GHz, a band of frequencies near or including 4.9 GHz, a band of frequencies near or including 5 GHz, a band of frequencies near or including 5.9 GHz and/or another band of frequencies. Note that the bands of frequencies may include one or more bands of frequencies.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized by a mobile-network operator to maximize the performance of the cellular-telephone network (such as the throughput, the capacity, the block error rate, etc.) and to reduce cross-talk or interference between the signals transmitted by different cell towers and/or different macro cells.

However, there are often gaps in the coverage offered by macro cells. In particular, gaps in radio coverage can occur in the interior of a building because the transmission in a macro cell may not be powerful enough to penetrate the building. Consequently, some users operate local transceivers that provide short-range communication in the cellular-telephone network. These so-called 'femto cells' provide short-range communication (e.g., up to 10 m) for a few individuals.

In addition, larger entities or organizations (such as those with 50-60 users) may operate local transceivers that provide communication in the cellular-telephone network over a range of 100 m. In principle, such a small-scale network complements the service offered by the network operator and can offer improved communication performance, such as in a particular venue or environment. This intermediate-range coverage in the cellular-telephone network is typically referred to as a 'small cell.'

Recently, entities have established or hosted small cells based on a data communication protocol, such as LTE. (However, as noted previously, a wide variety of communication techniques or protocols may be used to implement a small cell, such as those used in cellular systems or to communicate with a radio-access network and are not limited to LTE. For example, in some embodiments the described communication technique is used in conjunction with Wi-Fi.) These small cells are examples of enterprise-hosted networks or EHNs (which are sometimes referred to as 'neutral-host networks'), i.e., networks that are hosted by entities other than a mobile-network operator (such as a cellular-telephone carrier). In the discussion that follows, the small cells or EHNs are sometimes referred to as visited networks.

In principle, a small cell that implements an LTE network can allow an entity (such as a company or an enterprise) to provide a wide variety of local services, as well as offer connectivity to a cellular-telephone network operated by a mobile-network-operator. For example, such visited networks can be deployed in various locations, such as shopping malls, enterprises, stadiums, etc.

However, one challenge is how to distribute credentials to electronic devices (such as users' cellular telephones) so that the electronic devices can be onboarded and can establish connections with a visited network. As noted previously, when a user has a subscription with a visited-network operator, then they can use the local service(s) provided in a visited network. Unfortunately, the large number of visited networks may make this approach unwieldy.

Users that do not have a direct subscription in a visited network can still attach to such a visited network if the visited-network operator has previously established a relationship with the home or mobile-network operator of the user. In this case, users of the cellular-telephone network may access the services of their mobile-network operator via the visited network. For example, this roaming approach is supported by a $3^{rd}$ Generation Partnership Project or 3GPP (of Sophia Antipolis Cedex, France) and a Global System for Mobile Communication Association or GSMA (of London, England).

Even though the users can attach in the visited network, they still cannot use the services locally rendered by the visited network. In order to do so, the mobile-network operator typically has to allow the users to use the services that are local to visited network. In the 3GPP-defined architecture, the mobile-network operator usually needs to be aware of the local services in the visited network and has to provision the subscriber for them. However, as the small visited networks evolve, local services offered in these visited networks will be dynamic and diverse. Consequently, keeping track of the many visited networks and the local services offered in each of these visited networks will be complicated and challenging. This complexity may deter the mobile-network operators from allowing their subscribers to use the local services rendered in the visited networks.

In order to address these challenges, the communication technique may be used to enable local services rendered in a visited network for a visiting user or subscriber by using 3GPP, CBRS or multi-factor authentication (MFA)-defined network attach procedures, without requiring configuration or software modifications by the mobile-network operator.

FIG. 1 presents a block diagram illustrating radio nodes 110 (such as a transceiver or an electronic device that is associated with a small cell that communicates using Wi-Fi or LTE, e.g., it may be or may provide at least some of the functionality of an eNode-B, in a small-cell LTE network associated with or provided by an entity, such as a visited-network operator) and electronic device 112 (such as a portable electronic device, e.g., a cellular telephone or a smartphone) wirelessly communicating in a visited network 108 in an environment (such as in or at a venue or a building associated with the visited-network operator) according to some embodiments. In particular, radio nodes 110 and electronic device 112 may wirelessly communicate while: transmitting advertising frames on wireless channels, detecting one another by scanning wireless channels, establishing connections (for example, by transmitting association or attach requests), and/or transmitting and receiving packets (which may include the association requests and/or additional information as payloads).

Moreover, radio nodes 110 may communicate, via network 114, with a visited-network core 116 (such as an electronic device 118 or a computer that implements the communication technique). Furthermore, electronic device 118 may communicate, via network 120, with mobile-network-operator (MNO) infrastructure 122 of a cellular-telephone network 124 (such as the MNO core of the Evolved Packet Core or EPC). In particular, network 114 may include a local area network, an intranet or the Internet (and, more generally, a wired network), and network 120 may include the Internet (and, more generally, a wired network). Thus, radio nodes 110 may access MNO infrastructure 122 by communicating, via network 114, with electronic device 118 in visited-network core 116, which communicates, via network 120, with MNO infrastructure 122 of cellular-telephone network 124. For example, electronic device 118 may be a cloud-based computer that is a controller or an administrator for radio nodes 110. In general, communication between radio nodes 110 and electronic device 118 may involve a wired communication protocol, such as Ethernet.

Figure 5:
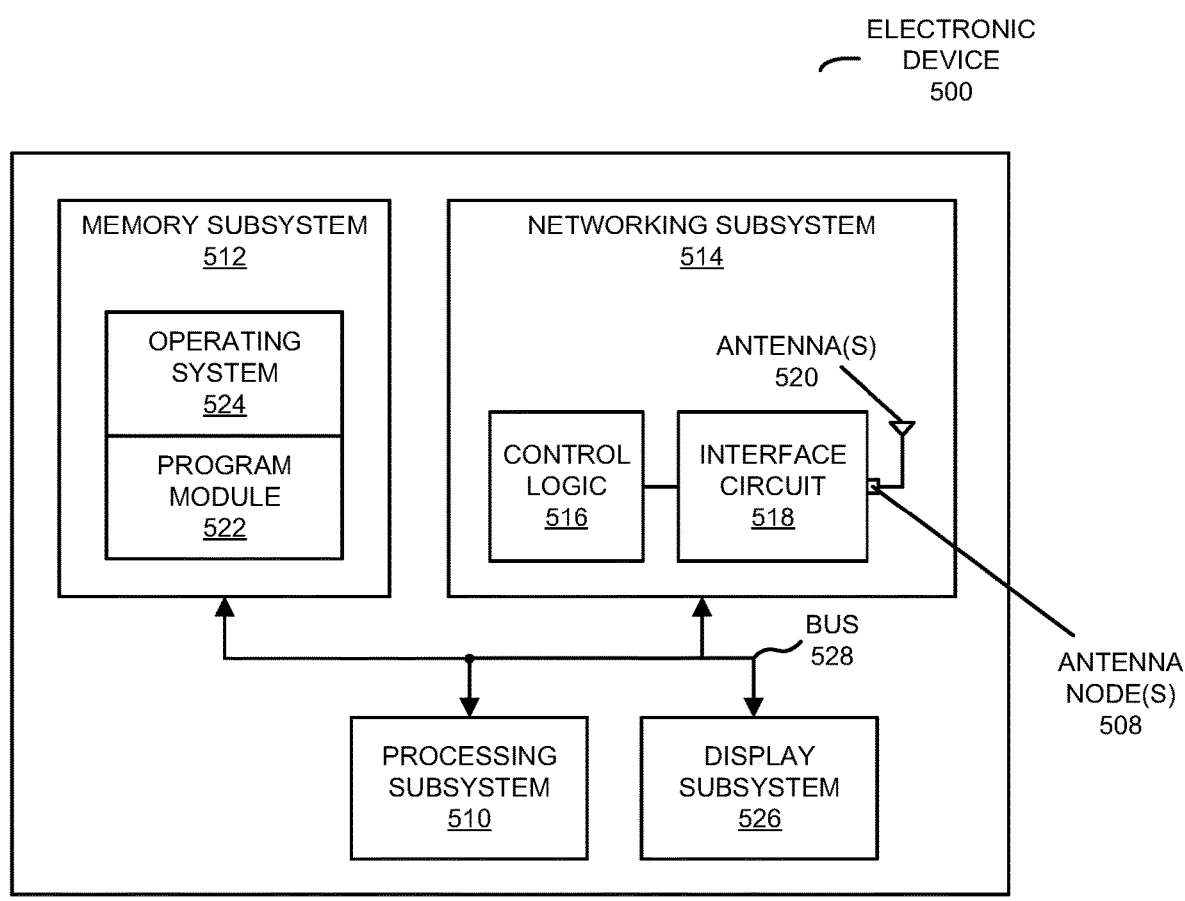
FIG. 5 is a block diagram illustrating an electronic device in accordance with an embodiment of the present disclosure.

As described further below with reference to FIG. 5, radio nodes 110, electronic device 112, and/or electronic device 118 may include subsystems, such as a networking subsystem, a memory subsystem and a processor subsystem. In addition, radio nodes 110 and electronic device 112 may include radios 126 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 126 are shown in radio nodes 110 and electronic device 112, one or more of these instances may be different from the other instances of radios 126.

As can be seen in FIG. 1, wireless signals 128 (represented by a jagged line) are transmitted from radio 126-2 in electronic device 112. These wireless signals may be received by radio 126-1 in radio node 110-1. In particular, electronic device 112 may transmit packets. In turn, these packets may be received by radio node 110-1. Moreover, radio node 110-1 may allow electronic device 112 to communicate with other electronic devices, computers and/or servers (either locally or remotely) via network 114, such as visited network 108 (such as a small-cell LTE network) and/or cellular-telephone network 124.

Note that the communication between radio nodes 110 and electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
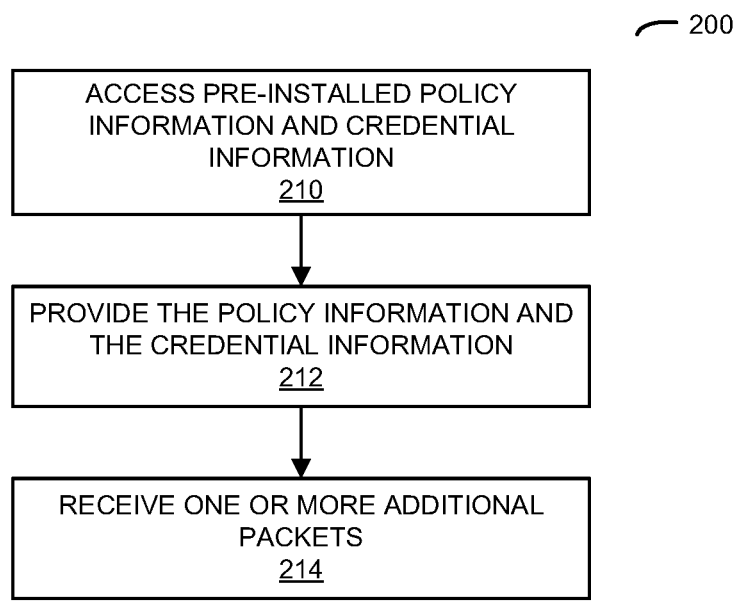
FIG. 2 is a flow diagram illustrating a method for establishing an APN transport pairing in accordance with an embodiment of the present disclosure.

As discussed further below with reference to FIGS. 2-4, in the communication technique electronic device 112 may be pre-provisioned with policy information and credential information. For example, the policy information and the credential information may be pre-installed in electronic device 112 by a user of electronic device 112 (such as if the user installs an application that executes on electronic device 112 and that includes the policy information and the credential information), a manufacturer of electronic device 112 or the mobile-network operator. The policy information and the credential information may identify an APN transport pairing with visited network 108. Thus, the policy information and the credential information may allow electronic device 112 to establish a CBRS APN transport pairing or connection with visited network 108 when electronic device 112 is visiting visited network 108. However, a visited-network operator may define the details of one or more local services that are provided in visited network 108, and thus how traffic to or from electronic device 112 is routed. For example, visited network 108 (such as visited-network core 116) may specify the destination server(s) and/or the mapping of application traffic to these server(s) that are performed by visited network 108 when providing the one or more local services. Thus, there may be two sets of policies: one that resides on electronic device 112 that allows electronic device 112 to setup a session using the APN transport pairing; and another that is enforced by visited network 108 on the traffic flowing via this session.

In particular, electronic device 112 may provide one or more packets or frames to electronic device 118 via radio node 110-1 and network 114. For example, electronic device 112 may communicate with radio node 110-1 using an LTE communication protocol. Note that the one or more packets or frames may include the policy information and the credential information. In some embodiments, the policy information and the credential information are included in a network layer in electronic device 112. Based on the policy information and the credential information, electronic device 112 may establish the APN transport pairing or packet data network (PDN) connection between electronic devices 112 and 118 in visited network 108.

Moreover, the one or more packets or frames may include additional information. For example, the additional information may include: authentication information that authenticates electronic device 112 to cellular-telephone network 124, credentials for an account with cellular-telephone network 124, and/or subscriber information. Using the additional information, electronic device 118 may, via network 120, communicate the additional information to MNO infrastructure 122 of cellular-telephone network 124, so that MNO infrastructure 122 establishes one or more additional transport pairings or PDN connections between electronic device 112 and cellular-telephone network 124. In particular, after authenticating a subscriber or user of electronic device 112, MNO infrastructure 122 may establish a transport pairing associated with voice traffic and, in conjunction with International Mobile Services (IMS) 130, may establish an IMS transport pairing associated with voice traffic. More generally, these or other transport pairings may be established to provide services to electronic device 112, such as an MMS transport, etc.

Subsequently, electronic device 118 may filter traffic with electronic device 112. In particular, packets or frames associated with one or more local service(s) in visited network 108 may be processed by electronic device 118 (e.g., electronic device 118 may provide one or more APN services in visited network 108 via the APN transport pairing), while packets or frames associated with one or more services in cellular-telephone network 124 may be forwarded or provided to MNO infrastructure 122 for further processing.

Thus, the communication technique may allow electronic device 112 to efficiently and simply establish the APN transport pairing, thereby facilitating services in visited network 108 without requiring a pre-existing subscription to visited network 108 or provisioning or approval by a mobile-network operator of cellular-telephone network 124. Consequently, the communication technique may improve services, communication and customer satisfaction when using visited network 108 and the shared-license-access band of frequencies.

In the described embodiments processing a packet or frame in radio nodes 110 and/or electronic device 112 includes: receiving wireless signals 128 with the packet or frame; decoding/extracting the packet or frame from received wireless signals 128 to acquire the packet or frame; and processing the packet or frame to determine information contained in the packet or frame (such as information for the small-cell LTE network).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. In some embodiments, additional transport pairings are established between electronic devices 112 and 118 and/or between electronic device 112 and MNO infrastructure 122.

We now describe embodiments of the method. FIG. 2 presents a flow diagram illustrating an example of a method 200 for establishing an APN transport pairing, which may be performed by an electronic device, such as electronic device 112 in FIG. 1. During operation, the electronic device may access pre-installed policy information and credential information (operation 210) in the electronic device, which are associated with a visited network. For example, the policy information and credential information may be stored in memory in the electronic device. Alternatively or additionally, the policy information and credential information may be associated with an application that is installed on and that executes in an environment of the electronic device. Note that the policy information and credential information may include specify an APN transport pairing with the visited network.

Then, the electronic device provides, to an output node of the electronic device, the policy information and credential information (operation 212) for another electronic device in the visited network (such as electronic device 118 in FIG. 1). For example, the electronic device may provide one or more packets with the policy information and credential information that include information specifying a network address of the other electronic device in the visited network. In some embodiments, the one or more packets include additional information, such as: authentication information that authenticates the other electronic device to a cellular-telephone network, credentials for an account with the cellular-telephone network, and subscriber information. As described further below with reference to FIG. 3, in some embodiments the electronic device is first authenticated with the cellular-telephone network using a mobile-network-operator credential before establishing the APN transport pairing.

Next, the electronic device receives, from an input node of the electronic device, one or more additional packets (operation 214) associated with the other electronic device in the visited network, where the one or more additional packets indicate that the ABN transport pairing between the electronic device and the other electronic device in the visited network has been established. For example, the one or more additional packets may be received from the other electronic device. In some embodiments, the one or more additional packets indicate that one or more additional transport pairings have been established between the electronic device and the cellular-telephone network. For example, the one or more additional transport pairings may include: a transport pairing associated with voice traffic, and/or a transport pairing associated with data traffic (such as an IMS transport pairing, an MMS transport pairing, etc.).

Figure 3:
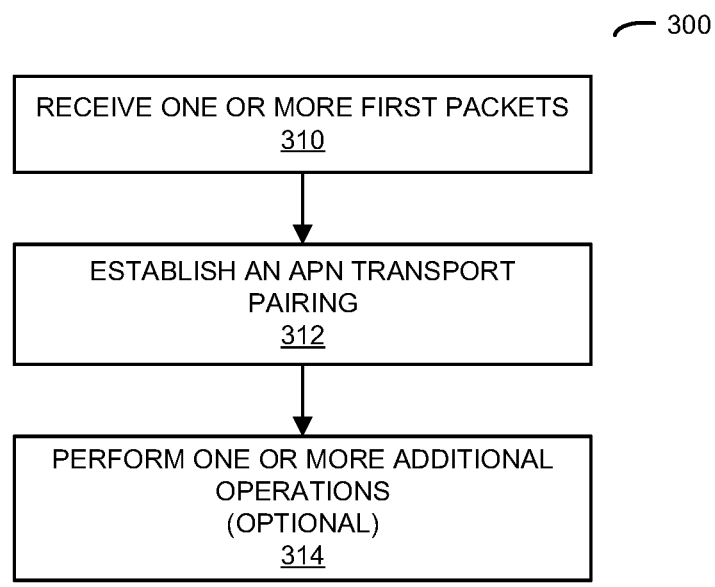
FIG. 3 is a flow diagram illustrating a method for establishing an APN transport pairing in accordance with an embodiment of the present disclosure.

FIG. 3 presents a flow diagram illustrating an example of a method 300 for establishing an APN transport pairing, which may be performed by an electronic device, such as electronic device 118 in FIG. 1. During operation, the electronic device may receive, from an input node of the electronic device, one or more first packets (operation 310) associated with another electronic device (such as electronic device 112 in FIG. 1), where the one or more first packets include policy information and credential information. For example, the one or more first packets may be received from the other electronic device. Note that the policy information and the credential information may specify the APN transport pairing with the visited network. Moreover, the policy information and the credential information may be pre-installed in the other electronic device.

Then, based on the policy information and the credential information, the electronic device may establish, via an output node of the electronic device, the APN transport pairing (operation 312) between the electronic device and the other electronic device, where the APN transport pairing is associated with the visited network.

In some embodiments, the electronic device optionally performs one or more additional operations (operation 314). For example, establishing the APN transport pairing (operation 312) may involve the electronic device may provide, to the output node, a packet for the other electronic device (such as a packet that includes a network address of the other electronic device) that indicate that the APN transport pairing has been established.

Note that the one or more first packets may include additional information, such as: authentication information that authenticates the other electronic device to a cellular-telephone network, credentials for an account with the cellular-telephone network, and subscriber information. Moreover, prior to establishing the APN transport pairing (operation 312), the electronic device may: provide, to the output node, a second packet for mobile-network-operator infrastructure, where the second packet includes the additional information; receive, from the input node, a third packet associated with the mobile-network-operator infrastructure that indicates a second transport pairing has been established between the other electronic device and the cellular-telephone network; and provide, to the output node, a fourth packet for the other electronic device that indicates that the second transport pairing has been established between the other electronic device and the cellular-telephone network. Thus, in some embodiments, the electronic device may be authenticated with the cellular-telephone network using a mobile-network-operator credential before establishing the APN transport pairing (operation 312).

Alternatively or additionally, the electronic device may: provide, to the output node, a second packet for the mobile-network-operator infrastructure, where the second packet includes a request to establish a second transport pairing; receive, from the input node, a third packet associated with the mobile-network-operator infrastructure that indicates that the second transport pairing has been established between the other electronic device and the cellular-telephone network; and provide, to the output node, a fourth packet for the other electronic device that indicates that the second transport pairing has been established between the other electronic device and the cellular-telephone network. For example, the second transport pairing may include an IMS transport pairing, an MMS transport pairing and/or may be associated with data traffic.

In some embodiments of methods 200 (FIG. 2) and/or 300, there may be additional or fewer operations. Furthermore, the order of the operations may be changed, and/or two or more operations may be combined into a single operation.

Figure 4:
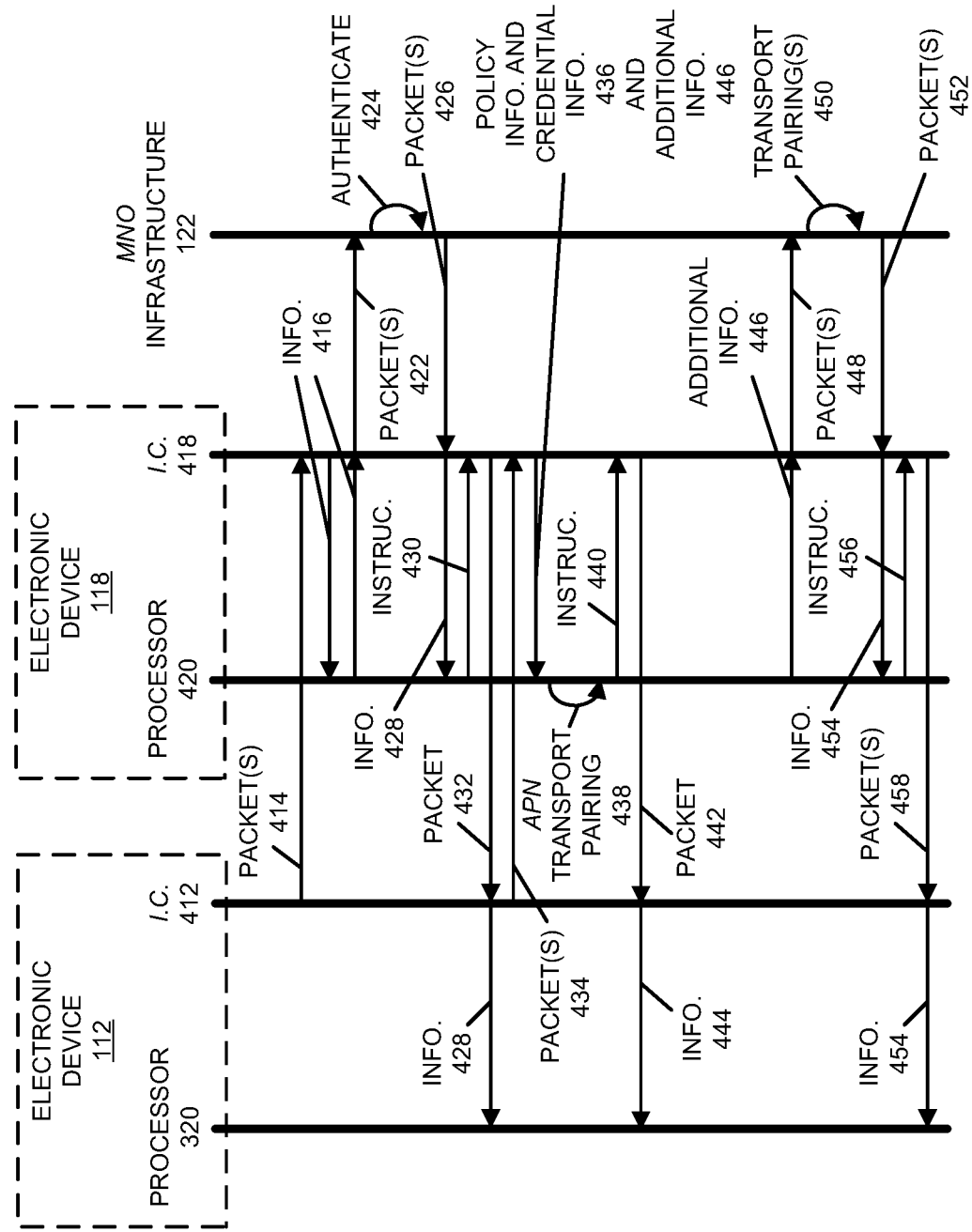
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication among radio node 110-1, electronic device 112, electronic device 118 and MNO infrastructure 122. In particular, interface circuit (I.C.) 412 in electronic device 112 may provide one or more packets 414 with information 416 to interface circuit 418, which provides information 416 to processor 420 in electronic device 118. Then, processor 420 may provide one or more packets 422 with information 416 to MNO infrastructure 122. Note that information 416 may include: authentication information that authenticates electronic device 112 to cellular-telephone network 124 (FIG. 1), credentials for an account with cellular-telephone network 124 (FIG. 1), and/or subscriber information.

Based on information 416, MNO infrastructure 122 may authenticate 424 a user of electronic device 112 (such as a subscriber of cellular-telephone network 124 in FIG. 1), and may establish a transport pairing 426 between electronic device 112 and cellular-telephone network 124 (FIG. 1). Then, MNO infrastructure 122 may provide one or more packets 426 with information 428 that indicates that transport pairing 424 has been established. In response, processor 420 may instruct 430 interface circuit 418 to provide a packet 432 with information 428 to electronic device 112. After receiving packet 432, interface circuit 412 may provide information 428 to processor 320 in electronic device 112.

Subsequently, interface circuit 412 may provide one or more packets 434 with policy information and credential information 436, to electronic device 118.

After receiving the one or more packets 434, interface circuit 418 may provide the policy information and credential information 436 and/or additional information 446 to processor 420.

Based on the policy information and credential information 436, processor 420 may establish an APN transport pairing 438 between electronic device 112 and a visited network that includes electronic device 118. For example, APN transport pairing 436 may be associated with local services in visited network 108, such as: voice, text (short message service), data and/or an MMS. Then, processor 420 may instruct 440 interface circuit to provide a packet 442 to electronic device 112 that indicates that the APN transport pairing 436 has been established. After receiving packet 442, interface circuit 412 may provide information 444 to processor 410 that indicates that the APN transport pairing 436 has been established.

Moreover, processor 420 may provide additional information 446 to interface circuit 418, which provides one or more packets 448 with additional information 446 to MNO infrastructure 122. Based on additional information 446, MNO infrastructure 122 may establish one or more transport pairings 450 (such as a transport pairing for voice traffic and a transport pairing for data or LTE traffic) between electronic device 112 and cellular-telephone network 124 (FIG. 1). Then, MNO infrastructure 122 may provide one or more packets 452 that indicate that the one or more transport pairings 450 have been established.

After receiving the one or more packets 452, interface circuit 418 may provide information 454 to processor 420 that indicates that the one or more transport pairings 450 have been established. In response, processor 420 may instruct 456 interface circuit 418 to provide one or more packets 458 to electronic device 112 with information 454.

While FIG. 4 illustrates particular operations involving unilateral or bilateral communication, in general each of the operations illustrated in FIG. 4 may involve unilateral or bilateral communication. Moreover, while packets 414 and 434 are shown as being exchanged between electronic device 112 and electronic device 118, in some embodiments the information exchanged between electronic device 112 and electronic device 118 (such as information 416, policy information and credential information 436 and/or additional information 446) may be exchanged using fewer or more packets or frames in one or more packets.

In some embodiments, the communication technique facilitates establishing an ABN transport pairing in a visited network. In these embodiments, note that a visited network may be a visited network only when the associated visited-network operator has a prior business relationship with a mobile-network operator. Without this relationship, it may not be possible for a visiting user or subscriber to attach to the visited network. As part of setting up this relationship, the visited-network operator may get an agreement with the mobile-network operator to allow mobile-network subscribers to use at least some of the local data services in the visited network.

In order to accomplish this, a dedicated APN may be defined for encapsulating the local services in the visited network. This APN maybe defined by a standards forum (such as 3GPP, CBRS, MFA, etc.) or may be agreed to or defined by the mobile-network operator. This APN may denote a private service, but may not define the nature or type of service. If a standards body does not define this APN, then this APN may be pre-provisioned in the user's electronic device as part of a universal subscriber identity module (USIM) or as part of installing other policies in the electronic device (such as a mobility policy).

When the electronic device enters a visited-network coverage area, it may attach to the visited network and set up a default bearer or connection with the mobile-network operator. As part of this attach procedure, the CBRS/neutral hosted network (NHN)/visited-network core may authenticate the electronic device by using the mobile-network operator home subscriber server (HSS)/authentication, authorization, accounting (AAA) server via 3GPP defined standard interfaces, such as an S6a/STa interface.

Once the default bearer has been established, the electronic device may automatically create another bearer or connection (which is sometimes referred to as a 'second bearer') using the well-defined, dedicated APN. Note that there may be further optimizations in the electronic device or the optimizations may be driven through a policy if the electronic device has to establish the second bearer selectively on certain networks alone. For example, an electronic device may establish this second bearer only when the visited network is a CBRS/NHN and/or if the electronic device is able to detect that the visited network offers a private service.

The outcome of the second-bearer establishment may depend on the situation. In a first situation, the visited network may not offer a local service. In this case, the second-bearer establishment may fail using an appropriate error code to indicate that there are no local services in the visited network. The electronic-device behavior may default to using the mobile-network-routed bearer(s) for all services.

Alternatively, in the second situation, the visited network may provide one or more private services. In this situation, the second bearer may be established in the visited network. Then, the visited network may provide one or more packet filters (such as traffic-flow templates) as part of establishing the second bearer. These packet filters may be derived based on the services that are locally rendered in the visited network. Using the packet filters, the electronic device may be able to map applications/local services to the second bearer. For example, if the electronic device wants to access a server that is local to the visited network, is may use the bearer established for the visited network. This is because the local server details may be provided as part of the packet filters during the second-bearer establishment.

In some embodiments, as part of the default-bearer establishment, the visited network obtains the credentials of the electronic device (like MS-ISDN or a telephone number that uniquely identifies the electronic device to a cellular-telephone network, a username, etc.).

In addition to providing the local services to a visiting subscriber, the visited network operator may be able to perform admission control and/or user-aware service/quality-of-service (QoS). In admission control, the visited network operator may pre-provision whitelist or blacklist subscribers using one or more of the credentials that are used to authenticate the visiting subscriber. Based on a blacklist configuration, the visited network may allow successful establishment of the second bearer or may reject the establishment of the second bearer with an appropriate cause. Rejection of the second bearer may mean that the visiting subscriber does not get the services that are locally available in the visited network. However, these subscribers may still get the services provided by the mobile-network operator via the visited network.

In user-aware services /QoS, the visited or private-network operator may provide services based on a user profile. For example, a particular private-network operator may want to provide a better QoS or access to multiple services for employees in the visited-network premises or environment, while limiting the available services for guests of the premise. Thus, the employees may have access to more local services that guests (who may have access to a subset of the local services or may not have access to the local services at all).

We now describe embodiments of an electronic device, which may perform at least some of the operations in the communication technique. For example, the electronic device may include electronic device 112 in FIG. 1, or one of radio nodes 110 associated with a small cell or a transceiver associated with a wireless local area network in visited network 108 in FIG. 1. FIG. 5 presents a block diagram illustrating an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520. Note that nodes 508 may include one or more input nodes and/or one or more output nodes.) For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, an eNode-B, a router, a switch, communication equipment, an access point, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a radio node in a visited network, wherein the interface circuit is configured to:
receive, from an input node of the electronic device, one or more first packets associated with another electronic device, wherein the one or more first packets comprise policy information and credential information;
establish, with mobile-network-operator infrastructure in a cellular-telephone network, a transport pairing between the other electronic device and the cellular-telephone network based at least in part on additional information;
provide, to an output node of the electronic device, a message addressed to the other electronic device that indicates the transport pairing has been established; and
based on the policy information and the credential information, establish, via the output node of the electronic device, an access point name (APN) transport pairing between the electronic device and the other electronic device, wherein the APN transport pairing is associated with the visited network and uses a cellular-telephone communication protocol.

2. The electronic device of claim 1, wherein the policy information and the credential information specify the APN transport pairing with the visited network.

3. The electronic device of claim 1, wherein the policy information and the credential information are pre-installed in the other electronic device.

4. The electronic device of claim 1, wherein the visited network uses a shared-license-access band of frequencies.

5. The electronic device of claim 1, wherein the visited network uses a Long Term Evolution (LTE) communication protocol.

6. The electronic device of claim 1, wherein the transport pairing is established prior to establishing the APN transport pairing, and the one or more first packets comprise the additional information; and wherein establishing the transport pairing comprises:
providing, to the output node, a second packet addressed to the mobile-network-operator infrastructure, wherein the second packet comprises the additional information; and
receiving, from the input node, a third packet associated with the mobile-network-operator infrastructure that indicates the transport pairing has been established between the other electronic device and the cellular-telephone network.

7. The electronic device of claim 1, wherein the additional information comprises at least one of: authentication information that authenticates the other electronic device to the cellular-telephone network, credentials for an account with the cellular-telephone network, and subscriber information.

8. The electronic device of claim 1, wherein the transport pairing is associated with voice traffic.

9. The electronic device of claim 1,
wherein establishing the transport pairing comprises:
providing, to the output node, a second packet addressed to the mobile-network-operator infrastructure, wherein the second packet comprises a request to establish the transport pairing; and
receiving, from the input node, a third packet associated with the mobile-network-operator infrastructure that indicates that the transport pairing has been established between the other electronic device and the cellular-telephone network.

10. The electronic device of claim 1, wherein the transport pairing comprises an International Mobile Services (IMS) transport pairing.

11. The electronic device of claim 1, wherein the transport pairing is associated with data traffic.

12. The electronic device of claim 1, wherein the radio node comprises an eNode-B.

13. A non-transitory computer-readable storage medium for use in conjunction with an electronic device in a visited network, the computer-readable storage medium storing program instructions that, when executed by the electronic device, causes the electronic device to perform one or more operations comprising:
receiving, from an input node of the electronic device, one or more first packets associated with another electronic device, wherein the one or more first packets comprise policy information and credential information;
establishing, with mobile-network-operator infrastructure in a cellular-telephone network, a transport pairing between the other electronic device and the cellular-telephone network based at least in part on additional information;
providing, to an output node of the electronic device, a message addressed to the other electronic device that indicates the transport pairing has been established; and
establishing, via the output node of the electronic device, an access point name (APN) transport pairing between the electronic device and the other electronic device based on the policy information and the credential information, wherein the APN transport pairing is associated with the visited network and uses a cellular-telephone communication protocol.

14. The computer-readable storage medium of claim 13, wherein the policy information and the credential information specify the APN transport pairing with the visited network.

15. The computer-readable storage medium of claim 13, wherein the one or more first packets comprise the additional information;
wherein the transport pairing is established prior to establishing the APN transport pairing; and
wherein establishing the transport pairing comprises:
providing, to the output node, a second packet addressed to the mobile-network-operator infrastructure in the cellular-telephone network, wherein the second packet comprise the additional information; and
receiving, from the input node, a third packet associated with the mobile-network-operator infrastructure that indicates the transport pairing has been established between the other electronic device and the cellular-telephone network.

16. The computer-readable storage medium of claim 13, wherein the additional information comprises at least one of: authentication information that authenticates the other electronic device to the cellular-telephone network, credentials for an account with the cellular-telephone network, and subscriber information.

17. The computer-readable storage medium of claim 13, wherein establishing the transport pairing comprises:
providing, to the output node, a second packet addressed to the mobile-network-operator infrastructure in the cellular-telephone network, wherein the second packet comprises a request to establish an International Mobile Services (IMS) transport pairing; and
receiving, from the input node, a third packet associated with the mobile-network-operator infrastructure that indicates that the IMS transport pairing has been established between the other electronic device and the cellular-telephone network.

18. A method for establishing an access point name (APN) transport pairing, wherein the method comprises:
by an electronic device in a visited network:
receiving, from an input node of the electronic device, one or more first packets associated with another electronic device, wherein the one or more first packets comprise policy information and credential information;
establishing, with mobile-network-operator infrastructure in a cellular-telephone network, a transport pairing between the other electronic device and the cellular-telephone network based at least in part on additional information;
providing, to an output node of the electronic device, a message addressed to the other electronic device that indicates the transport pairing has been established; and
establishing, via an output node of the electronic device, the APN transport pairing between the electronic device and the other electronic device based on the policy information and the credential information, wherein the APN transport pairing is associated with the visited network and uses a cellular-telephone communication protocol.

19. The method of claim 18, wherein the policy information and the credential information specify the APN transport pairing with the visited network.

20. The method of claim 18, wherein the one or more first packets comprise additional information comprising at least one of: authentication information that authenticates the other electronic device to the cellular-telephone network, credentials for an account with the cellular-telephone network, subscriber information, and a request to establish an International Mobile Services (IMS) transport pairing;
 wherein the transport pairing is established prior to establishing the APN transport pairing; and
 wherein establishing the transport pairing comprises:
  providing, to the output node, a second packet addressed to the mobile-network-operator infrastructure in the cellular-telephone network, wherein the second packet comprises the additional information; and
  receiving, from the input node, a third packet associated with the mobile-network-operator infrastructure that indicates the IMS transport pairing has been established between the other electronic device and the cellular-telephone network.

* * * * *